United States Patent

Petrotta et al.

[11] Patent Number: 5,142,607
[45] Date of Patent: Aug. 25, 1992

[54] SPLICE BOX FOR OPTICAL WAVE GUIDE

[75] Inventors: Gianmaria Petrotta; Horst Besserer, both of Herborn, Fed. Rep. of Germany

[73] Assignee: Rittal-Werk Rudolf Loh GmbH & Co. KG, Fed. Rep. of Germany

[21] Appl. No.: 671,399

[22] Filed: Mar. 19, 1991

[30] Foreign Application Priority Data

Mar. 20, 1990 [DE] Fed. Rep. of Germany ....... 4008839

[51] Int. Cl.$^5$ .............................................. G02B 6/36
[52] U.S. Cl. ................................................ 385/135
[58] Field of Search ............... 350/96.10, 96.15, 96.20, 350/96.21, 96.22, 96.23; 385/135

[56] References Cited

U.S. PATENT DOCUMENTS

| | | | |
|---|---|---|---|
| 4,752,110 | 6/1988 | Blanchet et al. | 350/96.20 |
| 5,071,211 | 12/1991 | Debortoli et al. | 385/135 X |

FOREIGN PATENT DOCUMENTS

| | | | |
|---|---|---|---|
| 0215668 | 3/1987 | European Pat. Off. | 350/96.23 |
| 0293183 | 11/1988 | European Pat. Off. | 350/96.23 |
| 0369524 | 5/1990 | European Pat. Off. | |
| 8707876 | 9/1987 | Fed. Rep. of Germany | |
| 8504960 | 11/1985 | PCT Int'l Appl. | 350/96.20 |
| 2166262 | 4/1986 | United Kingdom | |
| 2198549 | 6/1988 | United Kingdom | 350/96.20 |

Primary Examiner—John D. Lee
Attorney, Agent, or Firm—Speckman & Pauley

[57] ABSTRACT

An optical wave guide splice box which can be installed in a control box or the like and which receives optical wave guide splicing cassettes. Incoming optical wave guide cables are split into optical wave guide fiber bundles and/or individual optical wave guide fibers and are connected in optical wave guide harnesses with outgoing individual optical wave guide fibers. At least a portion of the outgoing individual optical wave guide fibers are guided and connected to optical wave guide connectors in a front panel which closes off the optical wave guide splice box. Shunting, splicing and distribution of the optical wave guide exterior cables, the optical wave guide fiber bundles and the individual optical wave guide fibers is considerably easier, even in an optical wave guide splice box installed in a control box or the like. An optical wave guide splice pull, open towards the front and the top is extendably installed with at least two-section telescopic pulls in a component support which can be installed in the control box or the like. The front panel with the optical wave guide connectors is pivotally hinged in an area of the front lower edge of the optical wave guide splice pull and can be fastened in a closed position on the optical wave guide splice pull with releasable locking elements.

14 Claims, 1 Drawing Sheet

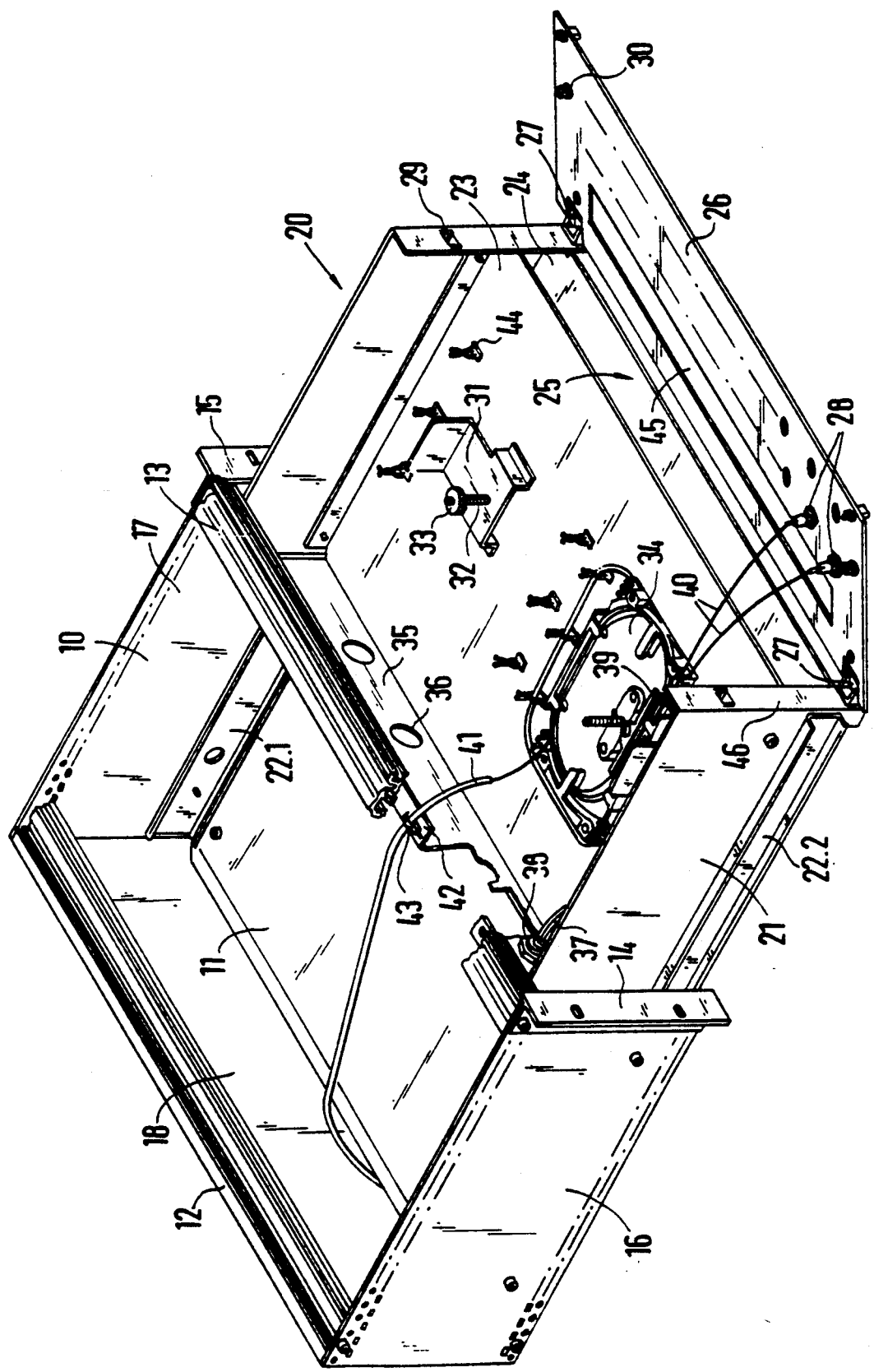

SPLICE BOX FOR OPTICAL WAVE GUIDE

BACKGROUND OF THE INVENTION

1. Field of the Invention

This invention relates to a splice box for an optical wave guide, which is installed in a control box and can be extended with a telescopic pull and which receives at least one optical wave guide splicing cassette. Incoming optical wave guide cables are split into optical wave guide fiber bundles and/or individual optical wave guide fibers and are connected in optical wave guide harnesses with outgoing individual optical wave guide fibers. At least a portion of the outgoing individual optical wave guide harnesses are guided and connected to optical wave guide connectors in a front panel which closes off the optical wave guide splice box.

2. Description of Prior Art

An optical wave guide of this type is known from European Reference EP 0 369 524 A2. Such optical wave guide splice box is installed directly in a shelf of the box via telescopic pulls. The front panel with the optical wave guide connectors is secured in the optical wave guide splice box. Installation of the optical wave guide splice box in the shelf of the box and wiring of the optical wave guide splice box is thus more difficult.

A cable end device is known from German Reference DE 87 07 876 01, which has a box-like housing that can be closed with a flap. In this device the cables are in the form of optical wave guides and extra lengths are stored in the housing. Clamping blocks, positioned on optical wave guide splicing cassettes, are fastened to the inside of the flap. This cable end device does not have any optical wave guide push connectors and is fixedly wired.

An optical wave guide splice box is known from British Reference GB 21 66 262 A1, which has a removable front panel positioned in front of a panel with optical wave guide plug connectors, which is fixedly installed in the housing. Prior to gaining access to the optical wave guide splicing cassettes, it is necessary to remove the front panel and to remove the pivotally seated panel.

SUMMARY OF THE INVENTION

It is one object of this invention to provide an optical wave guide splice box of the previously mentioned type which can be easily and quickly installed in a shelf of a splice box and which can be easily pulled out of the shelf for wiring, and where shunt cables required for connection can be housed in the optical wave guide splice box at the same time.

This object is achieved in accordance with this invention with the optical wave guide splice box constructed as an optical wave guide splice pull, open towards the front and the top, and installed with at least two-section telescopic pulls in a component support which is open towards the front. The component support comprises a bottom, two side walls and an at least partially open back. The side walls have, in the area of the front vertical edges, fastening angle irons, the fastening flanges of which are directed towards the outside. The front panel with the optical wave guide connectors is pivotally hinged in the area of the front lower edge of the optical wave guide splice pull and can be fastened in the closed position on the optical wave guide splice pull with releasable locking elements. A plurality of optical wave guide splicing cassettes can be fastened on top of each other on an intermediate bottom of the optical wave guide splice pull, which is positioned at a distance from the bottom of the optical wave guide splice pull and together they form a storage shelf for the shunt cables or the like.

The installation of the optical wave guide splice box with the telescopic pulls, in a component support of this type, results in a quick and simple installation in a shelf of a box, because the component support need only be connected with the box by the fastening flanges. The optical wave guide splice box can be easily pulled out of the component support and when the front panel is flipped open, access to the optical wave guide splicing cassettes, fixed on the intermediate bottom, is made easier. Thus, wiring of the optical wave guide splice distributor, in particular connection of the optical wave guide connectors, is possible in an easy manner. Distribution with the aid of the shunt cables, which takes place after wiring, is also simplified, because they can be stored on the storage shelf, or shunt cables which are not needed can be stored there.

In a further embodiment according to this invention, the back of the optical wave guide splice pull has circular holes in which the incoming optical wave guide exterior cables can be fixed free of tension with screw fasteners.

In another preferred embodiment according to this invention where spliced optical wave guide fiber bundles or individual optical wave guide fibers are again led out of the optical wave guide splice pull, the back of the optical wave guide splice pull is beveled in an area of the horizontal upper edge in a direction towards the front of the optical wave guide splice pull, for use as a fastening flange with fastening bores for applying fastening clamps.

Optical wave guide splicing cassettes are secured in the optical wave guide splice pull with cassette holders having threaded bolts positioned on the intermediate bottom of the optical wave guide splice pull, which can receive a plurality of optical wave guide splicing cassettes placed o top of each other and which can be fixed on the cassette holders with knurled nuts, which can be screwed on the threaded bolts. For additionally securing the optical wave guide fiber bundles and individual optical wave guide fibers, outside of the optical wave guide splicing cassettes, additional cable clamps are fastened on the intermediate bottom of the optical wave guide splice pull, in which optical wave guide fiber bundles or individual optical wave guide fibers can be fixed.

In accordance with one embodiment of this invention, for hinging and locking the front panel, the front edges of the side walls of the optical wave guide splice pull have flanges beveled towards the inside. The front panel is fastened to these flanges with hinges and the flanges have receivers for locking elements which are rotatably fixed in the front panel.

The invention will be described in detail by means of one preferred embodiment shown in the drawings.

BRIEF DESCRIPTION OF THE DRAWINGS

The FIGURE is a perspective view of an optical wave guide splice pull, pulled out of the component support of the optical wave guide splice box, where the unlocked front panel is opened or takes up a position in which the shunting and distribution of the optical wave guide exterior cables, the spliced optical wave guide fiber bundles and the individual optical wave guide fibers can be achieved in the simplest way.

DETAILED DESCRIPTION OF THE PREFERRED EMBODIMENT

The optical wave guide splice box in accordance with one preferred embodiment of this invention comprises the component support 10 which is fixedly installed in the control box or the like, and the optical wave guide splice pull 20, which is extendably housed in the component support 10. The component support 10 comprises the bottom 11 and the two side walls 16 and 17. In the embodiment shown in the FIGURE, the back 18 is open and only a part is covered by an edge of the bottom 11. The horizontal back and front top edges of the component support 10 form cross supports 12 and 13. The front vertical edges of the side walls 16 and 17 are connected with the fastening angle irons 14 and 15, which form outwardly directed fastening flanges for the component support 10. The fixed telescopic rails 22.1 of at least two-section telescopic pulls are fixed on the insides of the side walls 16 and 17 facing each other. The extendible telescopic rails 22.2 are fixed on the outsides of the side walls 21 of the optical wave guide splice pull 20. In the are of the open front, the side walls 21 are beveled towards the inside to form flanges 46, on which the front panel is fastened with hinges 27, in the area of the horizontal lower edge of the optical wave guide splice pull 20. The optical wave guide connectors are inserted into the front panel 26 and spliced individual optical wave guide fibers 40 are connected to them. The optical wave guide splice pull 20 has a back wall 35 in which circular holes 36 have been made for the entry of the optical wave guide exterior cables 37. The optical wave guide exterior cables 37 are fixed on the back wall 35 of the optical wave guide splice pull 20 with screw fasteners 38, free of tension.

The intermediate bottom 23 is inserted into the optical wave guide splice pull 20 above the bottom 24 and completes the storage shelf 25. The front panel 26 has an appropriate hole 45 through which there is access to the storage shelf 25 even when the front panel 26 is closed, or connected with the flanges 46. The storage shelf 25 can receive shunt cables or the like. The closed position of the front panel 26 is maintained with locking elements 30, which are inserted into the receivers 29 of the flanges 46 and are fastened therein by rotating.

The incoming exterior optical wave guide cables 37 are routed to the optical wave guide splicing cassettes 34 and are preferably wound around the optical wave guide splicing cassettes 34, to provide reserve lengths prior to insertion, fixed with their individual optical wave guide fibers in the optical wave guide splice harness 39 and connected with the outgoing individual optical wave guide fibers 40. Cassette holders 31 are fastened to the intermediate bottom 23 and support a threaded bolt 32. A plurality of optical wave guide splicing cassettes 34 can be stacked on top of each other on the cassette holders 31. The cassette holders 31 are mounted on the threaded bolt 32 and secured with the knurled nut 33. It is also possible to carry spliced optical wave guide fiber bundles or individual optical wave guide fibers 41 towards the back wall 35 out of the optical wave guide splice pull 20. The back wall 35 is beveled on its top edge towards the front to form the fastening flange 42. The fastening flange 42 has fastening bores for accommodating fastening clamps 43, which fix the individual optical wave guide fibers 41, free of tension.

What is claimed is:

1. In a splice box for an optical wave guide, the splice box being installed in a control box and the splice box being telescopically extendable with a telescopic pull, the splice box receiving at least one optical wave guide splicing cassette, in which a plurality of incoming optical wave guide cables are split into at least one of optical wave guide fiber bundles and individual optical wave guide fibers and which are connected in optical wave guide harnesses with outgoing individual optical wave guide fibers, at least a portion of the outgoing individual optical wave guide fibers are guided and connected to optical wave guide connectors in a front panel which closes off the optical wave guide splice box, the improvement comprising:

the optical wave guide splice box constructed as an optical wave guide splice pull (20) having an open front and an open top, a plurality of at least two-section telescopic pulls (22.1; 22.2) attached in a component support (10) which is open towards a front of said component support (10) and comprises a bottom wall (11), two side walls (16, 17) and an at least partially open back wall (18), said side walls (16, 17) having a plurality of fastening angle irons (14, 15) in an area of front vertical edges of said component support (10), said fastening angle irons (14, 15) being directed away from said component support (10);

a plurality of optical wave guide connectors (28) attached to said front panel (26), said front panel (26) pivotally hinged at a front lower edge of said optical wave guide splice pull (20), releasable locking means (29, 30) for fastening said front panel (26) with respect to said optical wave guide splice pull (20); and a plurality of optical wave guide splicing cassettes (34) fastenable on top of each other and positioned on an intermediate bottom wall (23) of said optical wave guide splice pull (20), said intermediate bottom wall (23) mounted at a distance from said bottom wall (11) of said optical wave guide splice pull (20), and said intermediate bottom wall (23) and said bottom wall (10) forming a storage shelf (25).

2. An optical wave guide splice box in accordance with claim 1, wherein said front panel (26) includes a hole (45) and said storage shelf (25) is accessible through said hole (45).

3. An optical wave guide splice box in accordance with claim 2, wherein said side walls (16, 17) of said component support (10) are connected with each other by a plurality of cross supports (12, 13) attached between a front horizontal upper edge and a back horizontal edge of each said side wall (16, 17).

4. An optical wave guide splice box in accordance with claim 3, wherein a back wall (35) of said optical wave guide splice pull (20) has at least one circular hole (36) through which incoming optical wave guide exterior cables (37) can be routed and secured free of tension with a plurality of screw fasteners (38).

5. An optical wave guide splice box in accordance with claim 4, wherein said back wall (35) of said optical wave guide splice pull (20) is beveled along a back wall horizontal upper edge in a direction towards a front of said optical wave guide splice pull (20) to form a fastening flange (42) having fastening bores for accommodating a plurality of fastening clamps (43).

6. An optical wave guide splice box in accordance with claim 5, wherein a plurality of cassette holder brackets (31) each having a threaded bolt (32) are secured to said intermediate bottom wall (23) of said optical wave guide splice pull (20), each said cassette holder bracket (31) able to receive said optical wave guide splicing cassettes (34) positioned on top of each other, and a threaded bolt (32) secured to each said cassette holder bracket (31) and mateable with a knurled nut (33) for fixing said optical wave guide splicing cassettes (34) on said cassette holder brackets (31).

7. An optical wave guide splice box in accordance with claim 6, wherein outside of said optical wave guide splicing cassettes (34) a plurality of cable clamps (44) are secured to said intermediate bottom wall (23) of said optical wave guide splice pull (20), in which one of optical wave guide fiber bundles and individual optical wave guide fibers can be fixed.

8. An optical wave guide splice box in accordance with claim 7, wherein a front vertical edge of each of two side walls (21) of said optical wave guide splice pull (20) has a flange (46) beveled towards an inside of said optical wave guide splice pull (20), said front panel (26) is fastened to said flanges (46) with hinges, and said releasable locking means comprises said flanges (46) having a plurality of receivers (29) for correspondingly engaging a plurality of locking elements (30) which are rotatably fixed in said front panel (26).

9. An optical wave guide splice box in accordance with claim 1, wherein said side walls (16, 17) of said component support (10) are connected with each other by a plurality of cross supports (12, 13) attached between a front horizontal upper edge and a back horizontal edge of each said side wall (16, 17).

10. An optical wave guide splice box in accordance with claim 1, wherein a back wall (35) of said optical wave guide splice pull (20) has at least one circular hole (36) through which incoming optical wave guide exterior cables (37) can be routed and secured free of tension with a plurality of screw fasteners (38).

11. An optical wave guide splice box in accordance with claim 10, wherein said back wall (35) of said optical wave guide splice pull (20) is beveled along a back wall horizontal upper edge in a direction towards a front of said optical wave guide splice pull (20) to form a fastening flange (42) having fastening bores for accommodating a plurality of fastening clamps (43).

12. An optical wave guide splice box in accordance with claim 1, wherein a plurality of cassette holder brackets (31) each having a threaded bolt (32) are secured to said intermediate bottom wall (23) of said optical wave guide splice pull (20), each said cassette holder bracket (31) able to receive said optical wave guide splicing cassettes (34) positioned on top of each other, and a threaded bolt (32) secured to each said cassette holder bracket (31) and mateable with a knurled nut (33) for fixing said optical wave guide splicing cassettes (34) on said cassette holder brackets (31).

13. An optical wave guide splice box in accordance with claim 1, wherein outside of said optical wave guide splicing cassettes (34) a plurality of cable clamps (44) are secured to said intermediate bottom wall (23) of said optical wave guide splice pull (20), in which one of optical wave guide fiber bundles and individual optical wave guide fibers can be fixed.

14. An optical wave guide splice box in accordance with claim 1, wherein a front vertical edge of each of two side walls (21) of said optical wave guide splice pull (20) has a flange (46) beveled towards an inside of said optical wave guide splice pull (20), aid front panel (26) is fastened to said flanges (46) with hinges, and said releasable locking means comprises said flanges (46) having a plurality of receivers (29) for correspondingly engaging a plurality of locking elements (30) which are rotatably fixed in said front panel (26).

* * * * *